United States Patent [19]

Saito et al.

[11] 4,280,944
[45] Jul. 28, 1981

[54] THERMOSETTING POLYURETHANE RESIN AND COATING AGENT THEREOF PREPARED FROM AT LEAST TWO POLYOXYALKYLENE POLYOLS, BLOCKING AGENT, CHAIN-ELONGATING AGENT, CROSS-LINKING AGENT AND A MIXTURE OF DIISOCYANATES

[75] Inventors: Takashi Saito; Kiyotsugu Asai, both of Yokohama; Toshihiko Kawabata, Fujisawa, all of Japan

[73] Assignee: Mitsui-Nisso Corporation, Tokyo, Japan

[21] Appl. No.: 150,684

[22] Filed: May 16, 1980

[30] Foreign Application Priority Data

May 17, 1979 [JP] Japan .................................. 54-59761

[51] Int. Cl.³ .............................................. C08L 75/04
[52] U.S. Cl. ............................... 260/29.2 TN; 528/45; 528/49; 528/67; 528/76
[58] Field of Search ................... 260/29.2 TN; 528/45, 528/49, 67, 76

[56] References Cited

U.S. PATENT DOCUMENTS

| | | | |
|---|---|---|---|
| 3,992,316 | 11/1976 | Pedain et al. ........................... | 528/67 |
| 3,997,592 | 12/1976 | Aufdermarsh ............... | 260/29.2 TN |
| 4,098,933 | 7/1978 | Burkhardt et al. .......... | 260/29.2 TN |
| 4,119,602 | 10/1978 | Isgur et al. ............... | 528/45 |
| 4,130,542 | 12/1978 | Chang et al. ........................ | 528/67 |
| 4,163,814 | 8/1979 | Asai et al. ............................. | 427/379 |
| 4,190,566 | 2/1980 | Noll et al. ..................... | 260/29.2 TN |

*Primary Examiner*—Maurice J. Welsh
*Attorney, Agent, or Firm*—Fisher, Christen & Sabol

[57] ABSTRACT

A thermosetting polyurethane resin which when used as a one-pack surface-protective coating agent for glass bottles, inorganic vessels, and the like exhibits excellent mechanical strength, appearance, and water resistance at sterilization temperatures of about 90° C. is obtained by interacting: (a) 10 to 40% by weight of at least two polyoxyalkylene polyols based on the weight of the nonvolatile matter of the thermosetting polyurethane resin, said at least two polyoxyalkylene polyols including 1 to 8% by weight relative to the nonvolatile matter of the thermosetting polyurethane resin of a nonionic surface active agent selected from the group consisting of a polyoxyethylene glycol or a polyoxyethylene-polyoxypropylene glycol, and mixtures thereof, (b) a monofunctional isocyanate-blocking agent, (c) a chain-elongating agent, (d) a cross-linking agent, and (e) a mixture of methylene-bis (4-cyclohexylisocyanate) and iso-phorone diisocyanate at a molar ratio in the range of from 1:0.3 to 1:1.5.

14 Claims, No Drawings

4,280,944

THERMOSETTING POLYURETHANE RESIN AND COATING AGENT THEREOF PREPARED FROM AT LEAST TWO POLYOXYALKYLENE POLYOLS, BLOCKING AGENT, CHAIN-ELONGATING AGENT, CROSS-LINKING AGENT AND A MIXTURE OF DIISOCYANATES

BACKGROUND OF THE INVENTION

1. Field of the Invention

This invention relates to a thermosetting polyurethane resin, an aqueous dispersed thermosetting polyurethane resin prepared by dispersing it in water and to coating agents comprising them. This invention particularly, relates to a one-pack type thermosetting polyurethane resin which possesses excellent mechanical strength, appearance, durability and water resistance as a surface-protective coating agent for beverage glass bottles which require sterilization with hot water.

2. Description of the Prior Art

With respect to a thermosetting polyurethane resin with high resistance to hot water, two-pack reactive type systems such as Desmodur/Desmophen by Bayer A.G. or a system by AULD Co. Ltd. are known. However, two-pack systems are difficult and costly to use.

One-pack type thermosetting polyurethane resin systems and one-pack systems which are water-dispersions thereof are known in the art. One-pack systems in which a blocked-isocyanate radical is employed are disclosed, for example, in Japanese Patent Publication examined No. 5989/1964, Japanese Patent Publication examined No. 11558/1978, Japanese Patent Publication examined No. 47519/1977, and Japanese Patent Publication not examined No. 105599/1978. However, when the prior art one-pack systems are used as a coating agent for glass bottles, the coatings do not have sufficient resistance to hot water so as to make sterilization of the coated bottles with hot water possible.

In U.S. Pat. No. 4,163,814 an aqueous dispersed polyurethane composition for coating glass bottles is disclosed. The film prepared from the composition, it is disclosed, has excellent mechanical strength, is waterproof, and does not lose its transparency when placed in hot water of 70° C.

The present invention is the result of an extensive study to overcome the disadvantages associated with the two-pack systems and with the prior art one-pack systems.

The present invention involves a one-pack type thermosetting polyurethane resin and water dispersions thereof, with such a high resistance (i.e. high mechanical strength and maintenance of transparency) to hot water as to make possible the hot water sterilization of articles coated with the cured resin at temperatures of about 90° C. The water-dispersions of the present invention can be substantially free of solvent.

SUMMARY OF THE INVENTION

According to the present invention, there is provided a thermosetting polyurethane resin, an aqueous dispersed thermosetting polyurethane resin, and a one-pack type coating agent for glass bottles, and vessels made of inorganic materials obtained by interacting: (a) 10 to 40% by weight of at least two polyoxyalkylene polyols based on the weight of the non-volatile matter of the thermosetting polyurethane resin, said at least two polyoxyalkylene polyols including 1 to 8% by weight relative to the nonvolatile matter of the thermosetting polyurethane resin of a nonionic surface active agent selected from the group consisting of a polyoxyethylene glycol or a polyoxyethylene-polyoxypropylene glycol, and mixtures thereof, (b) a monofunctional isocyanate-blocking agent, (c) a chain-elongating agent, (d) a cross-linking agent, and (e) a mixture of methylene-bis (4-cyclohexylisocyanate) and iso-phorone diisocyanate at a molar ratio in the range of from 1:0.3 to 1:1.5. The thermosetting polyurethane resin exhibits excellent mechanical strength, appearance and water resistance when used as a one-pack surface-protective coating agent for beverage glass bottles which require sterilization with hot water at temperatures of about 90° C.

The thermosetting polyurethane resin of the present invention when used as a coating agent prevents glass bottles or glass vessels from scattering upon breakage, is highly transparent, and protects the glass bottle as well as other inorganic substrates from scratch-marks. The thermosetting polyurethane resin can be used as a paint (colored or colorless), adhesive, modifier and the like in the form of a solution, water dispersion, powder and the like.

DETAILED DESCRIPTION OF THE INVENTION

The thermosetting polyurethane resins of the present invention are obtained by interacting: (a) 10 to 40% by weight of at least two polyoxyalkylene polyols based on the weight of the nonvolatile matter of the thermosetting polyurethane resin, said at least two polyoxyalkylene polyols including 1 to 8% by weight relative to the nonvolatile matter of the thermosetting polyurethane resin of a nonionic surface active agent selected from the group consisting of a polyoxyethylene glycol or a polyoxyethylene-polyoxypropylene glycol, and mixtures thereof, (b) a monofunctional isocyanate-blocking agent, (c) a chain-elongating agent, (d) a cross-linking agent, and (e) a mixture of methylene-bis (4-cyclohexylisocyanate) and isophorone diisocyanate at a molar ratio in the range of from 1:0.3 to 1:1.5.

Exemplary of the polyoxyalkylene polyols (a) which can be used in the thermosetting polyurethane resins of the present invention include polyether diols such as polyoxyethylene glycol, polyoxypropylene glycol, polyoxytetramethylene glycol, or copolymerized glycols such as polyoxyethylene-polyoxypropylene glycol, polyoxypropylene-polyoxytetramethylene glycol or the like, a terpolymerized glycol of propylene oxide, ethylene oxide and tetrahydrofuran and the like, and trifunctional polyoxyalkylene polyols such as those obtained by adding at least one alkylene oxide to glycerine, trimethylol propane, trimethylol ethane, or 1,2,6-hexane triol and the like. The preferred polyoxyalkylene polyols are bifunctional. The polyoxyalkylene polyols (a) used in the present invention include mixtures of polyether diols, mixtures of trifunctional polyoxyalkylene polyols, and mixtures of at least one polyether diol with at least one trifunctional polyoxyalkylene polyol.

The total amount of the polyoxyalkylene polyols (a) used in containing the thermosetting polyurethane resins of the present invention range from 10% to 40% by weight relative to the nonvolatile matter in the thermosetting polyurethane resin. Within this range, the lesser the amount used the more rigid are coated films made from the resin which results in better slip properties. However, with an amount less than 10%, the film's transparency and resistance to hot water are deteriorated. If an amount exceeding 40% is used, the coated film becomes unfavorably non-rigid.

The nonionic surface active agent which is included in the 10%–40% weight range of component (a) includes polyoxyethylene glycols with terminal hydroxyl groups having a molecular weight in the range of from 400 to 20,000, preferably, 5,000 to 10,000, propylene oxide and ethylene oxide copolymers having a molecular weight in the range of from 1,000 to 20,000, and preferably block copolymers of polyoxypropylene glycol with ethylene oxide. The amount of the nonionic surface active agent to be used in obtaining the thermosetting polyurethane resins of the present invention is in the range of from 1 to 8% by weight relative to the weight of the nonvolatile matter of the thermosetting polyurethane resin. An amount less than 1% lowers the self-emulsifiability of the resin, and an amount exceeding 8% causes deterioration of the water resistance of coatings formed from the resins. Thus, based upon the weight of the nonvolatile matter of the thermosetting polyurethane resin, the resins of the present invention contain: (1) 1% to 8% by weight of a polyoxyethylene glycol nonionic surface active agent or polyoxyethylene-polyoxypropylene glycol surface active agent or mixtures thereof and, (2) 2% to 39% by weight of at least one other polyoxyalkylene polyol, the total of the weight percentages of components 1 and 2 being in said range of 10% to 40%.

The methylene bis (4-cyclohexylisocyanate) is used as a mixture of stereoisomers. Exemplary of commercially available mixtures of the stereoisomers are Hylene W and Hylene Ws, manufactured by E. I. Dupont de Nemours & Co. The isophorone diisocyanate is used at a ratio in the range of from 0.3 to 1.5 moles thereof per one mole of the methylene bis (4-cyclohexylisocyanate). With an amount thereof less than 0.3 mole per mole of the methylene bis (4-cyclohexylisocyanate), the transparency of films formed from the resin is lowered. If the amount of the iso-phorone diisocyanate exceeds 1.5 moles per mole of the methylene bis (4-cyclohexylisocyanate, the heat resistance of coatings formed from the resin deteriorates. For example, it is liable to result in softening and stickiness of the coating upon heating. On a weight percentage basis, the amount of iso-phorone diisocyanate used is typically 4–40% by weight of the weight of the nonvolatile matter of the thermosetting polyurethane resin. The combined weight of the iso-phorone diisocyanate and the methylene bis (4-cyclohexylisocyanate) is suitably 20–70% by weight of the weight of the nonvolatile matter of the thermosetting polyurethane resin.

Chain-elongating agents useful for the preparation of polyurethane resin of the present invention are those conventionally used for the preparation of polyurethane elastomers. Exemplary of the chain-elongation agents are glycols, aminoalcohols, diamines and the like. They can be used singly or in combination. The glycols which can be used include ethylene glycol, 1,2-propylene glycol, 1,3-propylene glycol, 1,3-butylene glycol, 1,4-butylene glycol, 1,6-hexanediol, diethylene glycol, dipropylene glycol and the like. The aminoalcohols which can be used include monoethanolamine, monoisopropanolamine and the like. The diamines which can be used include ethylene diamine, butylene diamine, isophorone diamine, 4,4'-diaminodiphenyl methane, 3,3'-dichloro-4,4'-diamino-diphenyl methane, N-$\beta$-(aminoethyl)-$\gamma$-aminopropyl-trimethoxysilane and the like.

The amount of the chain-elongating agent to be used is such that the equivalent ratio NCO/H of the NCO groups in the above mixture of diisocyanates (e) to the total of the active hydrogen atoms (H) in the polyoxyalkylene polyols (a) and in the chain-elongating agent is at least 1 (one). The amount of the chain-elongating agent used is preferably such that no diisocyanate is present after the reaction of the polyoxyalkylene polyols (a) with the diisocyanates (e) and further with the chain-elongating agent. The molar ratio NCO/H is suitably within the range of 1 to 2. The amount of the chain-elongating agent is typically 10–50% by weight of the weight of the nonvolatile matter of the thermosetting polyurethane resin and varies inversely with the amount of polyoxyalkylene polyol (a).

The monofunctional isocyanate-blocking agent used includes phenols such as phenol, o-cresol, xylenol, nonylphenol and the like, lactams such as $\gamma$-butyrolactam, $\epsilon$-caprolactam and the like, oximes such as acetoxime, methylethyl-ketoxime, methylisobutyl-ketoxime, cyclohexanone-oxime, benzophenone-ketoxime and the like, imides such as succinic imide, phthalic imide and the like, malonic esters, acetoacetic esters, alcohols such as butanol, isopropanol, t-butanol and the like.

The blocking agent is used in such an amount as to subject to blocking a part of the free NCO groups in the reaction mixture obtained by the reaction of the polyoxyalkylene polyols (a) with the diisocyanates (e) and further with the chain-elongating agent. Typically, the amount of blocking agent used is 1–20 parts by weight per 100 parts by weight of the nonvolatile matter in the thermosetting polyurethane resin.

The cross-linking agent used includes polyfunctional alcohols, aminoalcohols, amines and the like. Specific examples of cross-linking agents useful in the present invention include trimethylol propane, pentaerythritol, glycerin, an adduct of trimethylol propane with propylene oxide having an OH-value above 450, an adduct of glycerin with propylene oxide having an OH-value above 450, diethanolamine, triethanolamine, triisopropanolamine, diisopropanolamine, an adduct of 1 mole of ethylene-diamine and 4 moles or less of propylene oxide, diethylene-triamine, triethylene-tetramine and the like.

The cross-linking agent is used in an amount in the range of from 1.2 to 4 equivalents of active hydrogen per free isocyanate group after the reaction with the blocking agent.

The thermosetting polyurethane resin of the present invention can be produced by first reacting the polyoxyalkylene polyols (a) with an excess amount of the diisocyanates (e) at a temperature in the range of from 50° to 90° C. for 1 to 3 hours, and further with the chain-elongating agent (c) at a temperature ranging from room temperature to 80° C. for 1 to 3 hours. Then, a reaction is carried out at a temperature in the range of from 50° C. to 80° C. for 5 to 30 minutes by adding a monofunctional isocyanate-blocking agent (b) to the resulting prepolymer having terminal NCO groups. A cross-linking agent (d) is added thereto at a temperature ranging from room temperature to 70° C. and reacted with the remaining NCO groups at a temperature in the range of from 50° C. to 70° C. for 1 to 2 hours to obtain the thermosetting polyurethane resin of this invention. The conditions shown above are conventional for the production of thermosetting polyurethane resins. The production of the resins of the present invention are not limited to the above conditions.

The polyoxyalkylene polyols (a) can be added as a mixture, as above, or separately in the production of the thermosetting polyurethane resins of the present invention. For example, a polyoxyalkylene polyol such as polyoxypropylene glycol can be reacted with an excess amount of the diisocyanates and further with the chain-elongating agent and isocyanate-blocking agent. Then, the nonionic surface active agent, such as polyoxyethylene glycol having terminal hydroxyl groups and having a molecular weight of from 400 to 20,000 is added to the reaction mixture and the reaction is continued for about one hour at about 70° C. before addition of the cross-linking agent.

The solvent for reaction can be optionally selected depending on the intended end use for the resin such as a coating for glass bottles, or powdered paint. The reaction mixture is usually dissolved uniformly enough with a ketone series solvent such as acetone, methylethylketone or the like to subject it to polymerization.

If a catalyst for the reaction is needed, known catalysts and known amounts which are used in the preparation of polyurethanes can be used in the present invention. Exemplary of the catalysts useful in the present invention are tin catalysts such as dibutyltin dilaurate or the like, amine catalysts, such as triethylene-diamine or the like.

In order to obtain a water dispersion, to the above resin solution, an amount of water ranging from 0.2 to 4 times by weight of the resin is added with agitation at room temperature to form an emulsion. Then the solvent is distilled off by conventional procedure to obtain a water dispersion of a thermosetting polyurethane resin substantially free of solvent.

This invention will be illustrated by way of the following examples wherein all parts and percentages are by weight unless otherwise indicated:

EXAMPLE 1

A reactor with a stirrer and a reflux condenser was purged with nitrogen gas, and 90 parts (hereinafter parts are referred to as parts by weight) of polyoxypropylene glycol having a molecular weight of 2000 (hereinafter referred to as PPG 2000), 237.5 parts of methylene bis (4-cyclohexylisocyanate) (Hylene W, E. I. DuPont de Nemours & Co.), 99.2 parts of isophoronediisocyanate (hereinafter referred to as IPDI) and 0.18 part of dibutyltin dilaurate (hereinafter referred to as DBTDL) were placed in the reactor and reacted at 70° C. for 1 hour, followed by the addition of 80 parts of acetone. To the resultant mixture, 121.7 parts of dipropylene glycol (hereinafter referred to as DPG) were added at 30° to 60° C. dropwise while removing heat of reaction to effect reaction at 70° C. for 1.5 hours. Thereafter, 21.8 parts of methylethylketoxime were added to the reaction mass and the resulting mixture was maintained at 70° C. for 10 minutes. Then, 18 parts of a nonionic surface active agent (polyoxyethylene-polyoxypropylene glycol having a molecular weight of about 14000 obtained by the addition reaction of polyoxypropylene glycol having a molecular weight of 2000 with ethylene oxide, hereinafter referred to as N-1) were added thereto to effect reaction at 70° C. for 1 hour.

Thereafter, 90 parts of acetone were added thereto, followed by the addition of 37.3 parts of triethanolamine (hereinafter referred to as TEA) at 40° C. to effect reaction at 60° C. for 1.5 hours. Then 300 parts of acetone were added thereto to form a uniform solution, and the resultant solution was cooled to room temperature and removed from the reactor to obtain about 1090 parts of resin solution (hereinafter referred to as resin S-1) with about 55% of nonvolatile matter and a viscosity (measured using a B-type rotation viscometer) of 3500 cps at 31° C.

Resin S-1 was coated uniformly on a glass plate with an applicator to obtain a film thickness in the range of from 100 to 150μ when dried, and the coated film was dried at about 30° C. for 30 minutes in a hot air dryer, and further cured at 150° C. for 30 minutes.

The properties of the film formed from resin S-1 are shown in Table-1.

100 parts of resin S-1 where charged into a homogenizer and about 60 parts of water were added dropwise thereto over about 3 hours while agitating at a high speed of about 2000 rpm to obtain an acetone containing water dispersion. The dispersion was transferred to a device equipped for vacuum agitation. Acetone was distilled off as the vacuum was gradually increased under agitation while maintaining the temperature of the dispersion at approximately room temperature. The dispersion was kept at a temperature of 25° C., and a pressure in the range of from 30 to 40 mmHg for 3 hours. About 112 parts of a water-dispersion (hereinafter referred to as dispersion E-1) having an acetone content of 0.5%, a nonvolatile matter content of 49% and a viscosity of 60 cps at 30° C. were obtained.

A film was formed by subjecting the dispersion to film formation similar to S-1 except the drying step was at 90° C. for 30 minutes. The properties of the film are shown in Table-1.

EXAMPLE 2

97.5 parts of PPG 2000, 207.7 parts of Hylene W, 173.1 parts of IPDI, 0.2 part of DBTDL, 115.5 parts of diethylene glycol (hereinafter referred to as DEG), 19.5 parts of N-1, 23.6 parts of methylethylketoxime, 40.4 parts of TEA and 510 parts of acetone were reacted according to the procedure and conditions used in Example 1. About 1180 parts of a resin solution (hereinafter referred to as resin S-2) were obtained, which had a nonvolatile matter content of 55% and a viscosity of 5,500 cps at 30° C. Resin S-2 was coated on a glass plate, dried and cured as was resin S-1 in Example 1. The properties of the film formed with resin S-2 are given in Table-1.

According to the procedure used in Example 1 to form the water-dispersed composition E-1, a water-dispersion of resin S-2 (hereinafter referred to as dispersion E-2) was obtained. It had an acetone content of 0.3%, a nonvolatile matter content of 49% and a viscosity of 80 cps at 30° C. Dispersion E-2 was coated on a glass plate, dried, and cured as was dispersion E-1 in Example 1. The film properties of the film formed with dispersion E-2 are shown in Table-1.

EXAMPLE 3

135.2 parts of PPG 2000, 194.6 parts of Hylene W, 161.7 parts of IPDI, 102.7 parts of DEG, 23.6 parts of methylethyl-ketoxime, 19.5 parts of N-1, 40.4 parts of TEA, 0.2 part of DBTDL and 510 parts of acetone were reacted according to the procedure and conditions used in Example 1. About 1180 parts of a resin solution (hereinafter referred to as resin S-3) were obtained. The resin solution had a nonvolatile matter content of 55% and a viscosity of 1000 cps at 30° C.

According to the procedure used in Example 1, a water-dispersion of resin S-3 (hereinafter referred to as dispersion E-3) was obtained. The water-dispersion E-3 had an acetone content of 0.3%, a nonvolatile matter content of 49% and a viscosity of 30 cps at 30° C.

Resin S-3 and dispersion E-3 were each coated on glass plates, dried, and cured as were resin S-1 and dispersion E-1, respectively in Example 1. The film properties of the films formed with resin S-3 and dispersion E-3 are shown in Table-1.

COMPARATIVE EXAMPLE 1

90 parts of PPG 2000, 342.6 parts of Hylene W, 115.8 parts of DPG, 21.8 parts of methylethyl-ketoxime, 18 parts of N-1, 37.3 parts of TEA, 0.18 part of DBTDL and 480 parts of acetone were reacted according to the procedure and conditions used in Example 1. About 1080 parts of a resin solution (hereinafter referred to as resin SC-1) were obtained. It has a non-volatile matter content of 55% and a viscosity of 3,000 cps at 30° C.

The procedure of Example 1 was used to obtain a water dispersion of resin SC-1 (hereinafter referred to as dispersion EC-1). The dispersion EC-1 had an acetone content of 0.4%, a nonvolatile matter content of 49% and a viscosity of 50 cps at 30° C.

Resin SC-1 and dispersion EC-1 were each coated on glass plates, dried, and cured as were resin S-1 and dispersion E-1, respectively in Example 1. The film properties of the films formed with resin SC-1 and dispersion EC-1 are given in Table-1:

with resin solution SC-1 and water-dispersion EC-1 in the hot water resistance test.

The thermosetting polyurethane resin of this invention has numerous advantages. It is usable as a protective coating agent for vessels such as glass vessels for which transparency and appearance are of great importance, because it provides a film having excellent mechanical strength and appearance. It is especially useful as a protective coating agent for beverage glass bottles which require sterilization with hot water. The coated film according to this invention can maintain sufficient mechanical strength and complete transparency even after passing through a sterilization step wherein the whole inner beverage is heated by heating the outside of the bottle with hot water at about 90° C. (pasteurizing step). Films formed from the resin are effective in preventing glass pieces from being scattered upon breakage of glass. Films formed from the resin are also effective in preventing non-broken inorganic materials from scratch marks.

The resin according to this invention is usable as a paint (colorless or colored), an adhesive, a modifier and the like in the form of a solution, water-dispersion, powder or the like. Conventional coloring agents can be incorporated into the resin to form a colored coating agent.

The thermosetting polyurethane resin of the present invention can be dried and cured in a conventional hot

TABLE 1

|  | Example |  |  | Comparative |
|---|---|---|---|---|
|  | 1 | 2 | 3 | Example 1 |
| Polyoxyalkylene glycols |  |  |  |  |
| (a) (%)* | 18 | 18 | 24 | 18 |
| Nonionic emulsifier (%)* | 3 | 3 | 3 | 3 |
| Hylene W/IPDI (molar ratio) | 1/0.49 | 1/0.98 | 1/0.98 | 1/0 |
| Chain-elongating agent | DPG | DEG | DEG | DPG |

| Film | Sample |  |  |  |  |  |  |  |
|---|---|---|---|---|---|---|---|---|
| properties | S-1 | E-1 | S-2 | E-2 | S-3 | E-3 | SC-1 | EC-1 |
| Transparency (1) | accepted | ← | ← | ← | ← | ← | ← | ← |
| Pencil hardness | HB | HB | HB | HB | B | B | HB | HB |
| After hot Transparency (1) | accepted | ← | ← | ← | ← | ← | rejected | ← |
| water resistance   Other unfavorable | none | ← | ← | ← | ← | ← | ← | ← |
| test (2)   phenomena (2) |  |  |  |  |  |  |  |  |
| Tensile strength (kg/cm$^2$) (3) | 620 | ← | 590 | ← | 360 | ← | 600 | ← |
| Elongation (%) (3) | 30 | ← | 70 | ← | 230 | ← | 30 | ← |
| Durability (4) | O | O | O | O | O | O | O | O |
| Resistance to alkalis (5) | O | O | O | O | O | O | O | O |

*: % by weight relative to the nonvolatile matter of resin solution.
In Table-1, footnotes (1), (2), (3), (4), and (5) are:
(1) Transparency: "accepted" is for films having a transparency equal to or higher than that of a glass plate by observation with the naked eye and "rejected" is for those having a recognizable haze.
(2) Hot water resistance: The film test piece is immersed in hot water at 85° C. for 2 hours and immediately thereafter cooled with cold water and then observed with the naked eye. The transparency is determined by the method of paragraph (1) above. Examination is made for the presence of unfavorable phenomena due to the hot water treatment such as shrinkage, stickiness and the like.
(3) These physical characteristics were determined by the respective methods prescribed in JISK-6301. In our tests, films having a thickness of about 100μ were used.
(4) Durability: The durability was determined by passing coated bottles 20 times to only the washing step of a Coca Cola ® bottling line for home-size bottles, and by measuring the degree of damage, that is, the degree of scratch marks produced during the passages. The degree of damage is: O - if the ratio of the number of bottles having at least one scratch mark with a length above 5 mm to the number of all tested bottles is ≦ 10%, X - if the ratio defined above is > 10%. The method used to coat the glass bottles in the durability test was: 500 ml size Coca Cola ® bottles were dipped into the resin solution or into the water-dispersion while being rotated at about 10 r.p.m., and then dried with hot air at a temperature in the range of from about 40 to 80° C. to such an extent that the greater part of the solution or water was volatilized. The coatings were then cured at 150° C. for 1 hour to obtain transparent coated bottles.
(5) Resistance to alkalis was determined by examining the appearance of coated bottles immediately after immersing them in an aqueous solution of 3.5% NaOH at 65° C. for 2 hours. O - no change was recognized, X - blushing.

As shown in Table-1, films formed with resin solutions S-1, S-2 and S-3 and water-dispersions E-1, E-2, and E-3 exhibit superior performance to films formed air oven heating system. It can be employed in the form of a water-dispersion substantially free of solvent, which makes it advantageous over a water-dispersed system containing solvent with respect to flammability and toxicity. It is also self-emulsifiable.

We claim:

1. A thermosetting polyurethane resin obtained by interacting:
   (a) a prepolymer having terminal NCO groups which is obtained by reacting at least one polyoxyalkylene polyol with methylene bis(4-cyclohexylisocyanate) and isophorone diisocyanate and then with a chain-elongating agent,
   (b) a monofunctional isocyanate-blocking agent,
   (c) a non-ionic surface active agent selected from the group consisting of a polyoxyethylene glycol or a polyoxyethylene-polyoxypropylene glycol, and mixtures thereof, and
   (d) a cross-linking agent
wherein said prepolymer is reacted with said monofunctional isocyanate-blocking agent, the total weight percentage of said at least one polyoxyalkylene polyol and said non-ionic surface active agent is 10 to 40% based upon the weight of the nonvolatile matter of the thermosetting polyurethane resin, the weight percentage of said non-ionic surface active agent is 1 to 8% relative to the weight of the non-volatile matter of the thermosetting polyurethane resin, and the molar ratio of the methylene bis(4-cyclohexylisocyanate) and iso-phorone diisocyanate is in the range of from 1:0.3 to 1:1.5.

2. A thermosetting polyurethane resin as claimed in claim 1 wherein said non-ionic surface active agent is a polyoxyethylene glycol with terminal hydroxyl groups having a molecular weight in the range of from 400 to 20,000 or propylene oxide and ethylene oxide copolymers having a molecular weight in the range of from 1,000 to 20,000 or mixtures thereof, and said at least one polyoxyalkylene polyol is selected from the group consisting of polyoxypropylene glycol, polyoxytetramethylene glycol, polyoxypropylene-polyoxytetramethylene glycol, terpolymerized glycols of propylene oxide and tetrahydrofuran, and trifunctional polyoxyalkylene polyols obtained by adding at least one alkylene oxide to glycerine, trimethylol propane, trimethylol ethane, or 1,2,6-hexane triol.

3. A thermosetting polyurethane resin as claimed in claim 1 wherein said monofunctional isocyanate-blocking agent is selected from the group consisting of phenol, o-cresol, xylenol, nonylphenol, γ-butyrolactam, ε-caprolactam, acetoxime, methylethyl-ketoxime, methylisobutyl-ketoxime, cyclohexanoneoxime, benzophenone-ketoxime, succinic imide, phthalic imide malonic esters, acetoacetic esters, butanol, isopropanol, and t-butanol.

4. A thermosetting polyurethane resin as claimed in claim 1 wherein said cross-linking agent is selected from the group consisting of trimethylol propane, pentaerythritol, glycerin, an adduct of trimethylol propane with propylene oxide having an OH-value above 450, an adduct of glycerin with propylene oxide having an OH-value above 450, diethanolamine, triethanolamine, triisopropanolamine, diisopropanolamine, an adduct of 1 mole of ethylene-diamine and 4 moles or less of propylene oxide, diethylene-triamine, and triethylene-tetramine.

5. A thermosetting polyurethane resin as claimed in claim 1 wherein said chain-elongating agent is selected from the group consisting of ethylene glycol, 1,2-propylene glycol, 1,3-propylene glycol, 1,3-butylene glycol, 1,-4-butylene glycol, 1,6-hexanediol, diethylene glycol, dipropylene glycol, monoethanolamine, monoisopropanolamine, ethylene diamine, butylene diamine, isophorone diamine, 4,4'-diamino-diphenyl methane, 3,3'-dichloro-4,4'-diamino-diphenyl methane, and N-β-(aminoethyl)-γ-aminopropyl-trimethoxysilane.

6. A thermosetting polyurethane resin as claimed in claim 1 which is in powdered form.

7. An aqueous dispersed thermosetting polyurethane resin prepared by dispersing the thermosetting polyurethane resin of claim 1 in water.

8. The aqueous dispersed thermosetting polyurethane resin of claim 7 wherein the water dispersion is substantially free of solvent.

9. A thermosetting polyurethane resin as claimed in claim 1 wherein said non-ionic surface active agent is added with said at least one polyoxyalkylene polyol in the production of said prepolymer.

10. A thermosetting polyurethane resin as claimed in claim 1 wherein said non-ionic surface active agent is added after reacting said blocking agent with said prepolymer.

11. A thermosetting polyurethane resin as claimed in claim 1 wherein the prepolymer is formed in the presence of a catalyst.

12. A thermosetting polyurethane resin as claimed in claim 1 wherein the methylene bis(4-cyclohexylisocyanate) and the isophorone diisocyanate are added as a mixture in the production of said prepolymer.

13. A coating agent for glass bottles, and vessels made of inorganic materials comprising a thermosetting polyurethane resin of claim 1.

14. A coating agent for glass bottles and vessels made of inorganic materials comprising an aqueous dispersion of a thermosetting polyurethane resin of claim 1.

* * * * *